March 7, 1933.  O. R. SCHOENROCK  1,900,305
CLUTCH COUPLING
Filed Jan. 13, 1930
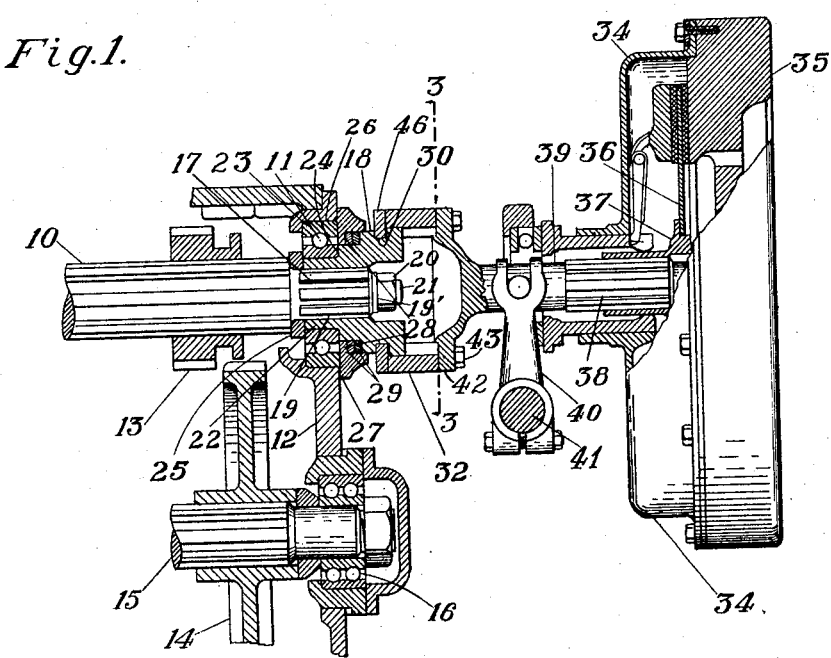
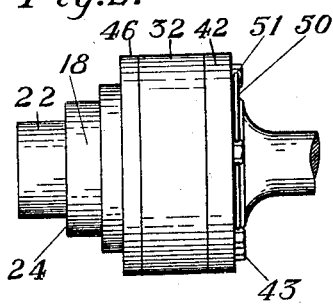
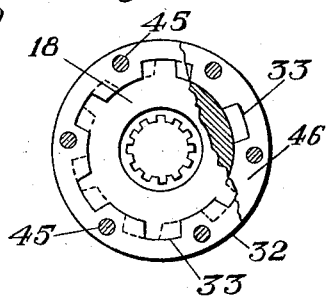
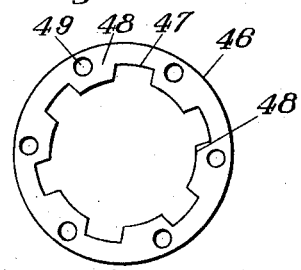
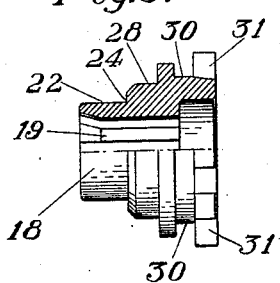
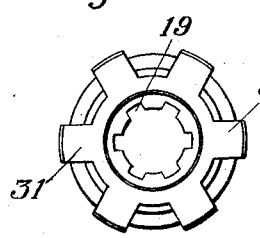
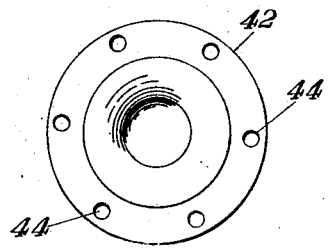
Inventor
Otto R. Schoenrock
By John P. Smith
Atty.

Patented Mar. 7, 1933

1,900,305

UNITED STATES PATENT OFFICE

OTTO R. SCHOENROCK, OF CHICAGO, ILLINOIS, ASSIGNOR TO OLIVER FARM EQUIPMENT COMPANY, A CORPORATION OF DELAWARE

CLUTCH COUPLING

Application filed January 13, 1930. Serial No. 420,379.

The present invention is directed to a novel and improved clutch coupling which forms a connection between the clutch shaft and transmission mechanism of a motor vehicle, and more especially of a tractor.

One of the principal objects of the present invention is to provide a novel and improved clutch coupling mechanism which is simple in construction and which will permit easy access thereto, so that the clutch as a unit thereof may be readily removed or replaced.

A further object of the invention is to provide a novel and improved construction of a clutch coupling mechanism in which the removal of the securing bolts permits the longitudinal displacement of the clutch shaft, so that the entire clutch mechanism may be removed from the vehicle as a unit.

These and other objects are accomplished by providing construction and an arrangement of the various parts in a manner hereinafter described and particularly pointed out in the appended claims.

Referring to the drawing:

Fig. 1 is a fragmentary side elevational view partly in cross section showing one embodiment of my invention.

Fig. 2 is a top plan view of the clutch coupling unit.

Fig. 3 is a cross sectional view taken on the lines 3—3 of Fig. 1.

Fig. 4 is a detail plan view of the clutch coupling washer.

Fig. 5 is an end elevational view of a clutch shaft.

Fig. 6 is a cross sectional view of one of the clutch coupling members; and

Fig. 7 is an end elevational view of the clutch member shown in Fig. 6.

In illustrating one embodiment of my invention, I have shown the same in connection with a fragmentary portion of the clutch and transmission mechanism of a motor vehicle which comprises the usual main transmission shaft 10 mounted in conventional anti-friction bearings 11, which in turn are supported in a divisional transverse wall 12 forming part of the frame structure of the motor vehicle or tractor. Splined to the transmission shaft 10 are the usual gears, one of which is shown at 13, which in turn is adapted to be moved in meshing relation with a gear 14 splined to a supplemental transmission shaft 15. Supplemental transmission shaft 15 in turn has its forward end journalled in an anti-friction bearing 16 mounted in the division wall 12 of the frame dividing the transmission compartment of the vehicle from the clutch housing of the same. The forward end of the main transmission shaft 10 is provided with a forwardly extending reduced splined portion 17 which is in the form of longitudinally extending ribs and grooves. Secured to the splined portion 17 of the main transmission shaft 10 is a clutch member 18 which in turn is provided with complementary cooperating grooves and ribs as shown at 19 for the securement of this member to the forward end of the shaft 10. The member 18 is further secured against longitudinal displacement from the end of the shaft by means of a washer 19' and a nut 20 mounted in threaded engagement with a threaded portion 21 of the shaft. The clutch member 18 is provided with a sleeve portion as shown at 22, which forms a support for securing one of the anti-friction bearing races 23 between a shoulder 24 and a washer 25, as clearly shown in Fig. 1. Encircling the clutch member 18 and contacting with the outer race 26 of the anti-friction bearing member 11 is a relatively fixed second washer 27 having an annular internal recess 28 formed therein for the reception of packing washers 29. Arranged about the periphery of the clutch member 18 is an annular or circular recess 30. Forward of this recess 30 and positioned at intervals about the periphery of the clutch member 18 are a plurality of radially disposed substantially rectangular lugs 31 which are adapted to telescopically receive in engagement therewith, a sleeve or collar 32 which is likewise provided with complementary internal recesses 33 corresponding to and adapted to cooperate with the radially projecting lugs 31 on the member 18 for forming the driving connection between the main transmission member 10 and the clutch shaft hereinafter described.

The clutch mechanism generally indicated at 34 comprises briefly the usual fly wheel 35 forming part of the driving member and clutch driven member generally indicated at 36 secured to its supporting hub 37. The supporting hub is splined to a splined portion 38 of a clutch shaft 39. The clutch mechanism is provided with the usual fork operating member 40 secured to the regular fork shaft 41, which is operated by the usual foot lever in the manner well understood in the art. The rearward end of the clutch shaft 39 has a disk-like portion 42 formed integrally therewith, which is adapted to have the clutch ring 32 secured thereto by means of bolts 43 which extend through the apertures 44 formed in the disk portion 42 of the shaft 39, and through registering apertures 45 formed in the clutch ring 32. The clutch shaft 39 and clutch ring 32 are secured to the clutch member 18 by means of a clutch washer 46, which is provided with regularly spaced apart internal recesses 47 corresponding to the spaced apart rectangular projections 31 formed on the clutch member 18, so that the clutch collar may be positioned on or slid rearwardly over the clutch member 18 into the position in the annular recess 30 formed in the clutch member 18 adjacent the peripheral lugs 31. When the clutch washer 46 is thus positioned and slightly revolved in one direction or the other with respect to the clutch member 18, the inwardly projecting portions 48 formed between the adjacent rectangular recesses 47 will contact with or substantially register with the lugs 31, so that the bolts 43 will register and engage threaded apertures 49 formed in the washer 46, thereby securing the clutch shaft 39 to the main transmission shaft 10 of the motor vehicle. After this is done, a suitable wire 50 may be inserted in the apertures 51 extending through the heads of the bolts 43, so as to prevent accidental displacement of these bolts from the clutch coupling members.

From the above description it will be readily seen that should it be necessary to remove the clutch mechanism from the motor vehicle, the same may be readily accomplished by removing the bolts 43, after which the clutch shaft 39 may be moved forwardly a slight distance so as to permit the removal of the clutch ring 32. When this is accomplished, the clutch then may be removed bodily as a unit. This construction, it will be noted, permits the removal of the clutch without the necessity of separating the rear frame portion of the motor vehicle or tractor from the front frame portion, and thereby reduces the amount of time and labor required for making the repair on the clutch mechanism.

While in the above specification I have described one embodiment which my invention may assume in practice, it will of course be understood that the same is capable of modification, and that modification may be made without departing from the spirit and scope of my invention as expressed in the following claims.

What I claim as my invention and desire to secure by Letters Patent is:

1. A clutch coupling for a transmission shaft comprising a clutch shaft having a disk like portion formed on one end thereof, a clutch ring secured to said disk-like portion, a clutch member secured to said transmission shaft and telescopically connected to said clutch ring, a clutch washer detachably mounted on said clutch member, and securing means extending through the disk-like portion of said clutch shaft, said clutch ring and said washer for securely fastening said clutch shaft to said transmission shaft.

2. A clutch coupling for a transmission shaft comprising a clutch shaft, a clutch ring secured to said shaft having a plurality of internal longitudinally extending grooves formed therein, a clutch member secured to said transmission shaft having a plurality of peripherally arranged complementary lugs adapted to engage in grooves in said clutch ring, a removable washer mounted on said clutch member having a plurality of internally extending lugs adapted to engage the lugs on said clutch member, and securing means extending through a portion of said clutch shaft, clutch ring, and washer for securing said clutch shaft to said transmission shaft.

3. A clutch coupling for a transmission shaft comprising a clutch shaft, having a disk-like portion formed on one end thereof, a clutch ring secured to the disk-like portion of said clutch shaft and having a plurality of regularly spaced apart longitudinally extending grooves and ribs formed therein, a clutch member secured to said transmission shaft and having one end thereof provided with a plurality of peripheral lugs complementary to the grooves formed in said ring, there being an annular recess formed adjacent the lugs on said clutch member, a washer having a plurality of internal longitudinally extending grooves complementary to the lugs formed on said clutch member whereby said washer may be slidably positioned over the lugs on said clutch member into the annular recess formed therein, so that the longitudinal recesses formed in said washer are offset with respect to the lugs on said clutch member, and threaded bolts extending through registered apertures in the ring and the disk portion of said clutch shaft, and engaging threaded apertures in said washer for securing said clutch shaft to said transmission shaft.

4. A clutch coupling for transmission shaft comprising a clutch shaft, a clutch member secured to said transmission shaft, a ring having a non-circular internal aperture for engaging a complementary non-circular portion of said clutch member, a clutch washer mounted on said clutch member, and means engageable with a portion of said clutch shaft, clutch ring and clutch washer for securely fastening said clutch shaft to said transmission shaft.

5. A clutch coupling for transmission shaft comprising a clutch shaft having a disc portion formed integrally therewith, a clutch member secured to said transmission shaft, a clutch ring having a non-circular internal aperture therein and secured to said disc, the clutch member having a non-circular external portion complementary to and adapted to engage said ring, a clutch washer mounted on said clutch member and bolts extending through said disc, clutch ring and clutch washer for securely fastening said clutch shaft to said transmission shaft.

In testimony whereof I have signed my name to this specification, on this 31st day of December A. D. 1929.

OTTO R. SCHOENROCK.